United States Patent
Osan et al.

(10) Patent No.: US 7,026,401 B1
(45) Date of Patent: Apr. 11, 2006

(54) METHOD OF PRODUCING AMORPHOUS POLYOLEFINS WITH A WIDE MOLE WEIGHT DISTRIBUTION

(75) Inventors: Frank Osan, Hamminkeln (DE); Klaus Berger, Sulzbach (DE); Dieter Ruchatz, Heiligenhaus (DE); Oliver Stark, Rodgau (DE); Toru Nakamura, Abiko (JP)

(73) Assignee: Ticona GmbH, (DE)

( * ) Notice: Subject to any disclaimer, the term of this patent is extended or adjusted under 35 U.S.C. 154(b) by 328 days.

(21) Appl. No.: 10/018,847

(22) PCT Filed: Jun. 21, 2000

(86) PCT No.: PCT/EP00/05759

§ 371 (c)(1),
(2), (4) Date: Dec. 27, 2001

(87) PCT Pub. No.: WO01/02481

PCT Pub. Date: Jan. 11, 2001

(30) Foreign Application Priority Data

Jun. 30, 1999 (EP) ................. 199 29 809

(51) Int. Cl.
*C08F 8/00* (2006.01)
*C08L 27/10* (2006.01)
*C08L 9/00* (2006.01)

(52) U.S. Cl. ............ 525/191; 525/209; 525/217; 525/232; 525/241

(58) Field of Classification Search ........ 525/240, 525/241, 191, 209, 211, 214, 216, 217, 232; 526/72, 88, 89, 160, 281, 308, 348, 348.6, 526/283, 943
See application file for complete search history.

(56) References Cited

U.S. PATENT DOCUMENTS

| | | | | |
|---|---|---|---|---|
| 5,008,356 A |   | 4/1991 | Ishimaru et al. | 526/281 |
| 5,087,677 A |   | 2/1992 | Brekner et al. | 526/160 |
| 5,371,158 A |   | 12/1994 | Brekner et al. | 526/127 |
| 5,498,677 A |   | 3/1996 | Weller et al. | 526/133 |
| 5,610,253 A | * | 3/1997 | Hatke et al. | 526/281 |
| 5,646,220 A | * | 7/1997 | Brekner et al. | 526/160 |
| 5,658,992 A |   | 8/1997 | Ehlers et al. | 525/240 |
| 5,723,546 A | * | 3/1998 | Sustic | 525/240 |
| 5,869,586 A |   | 2/1999 | Riedel et al. | 526/170 |
| 6,080,818 A | * | 6/2000 | Thakker et al. | 525/240 |
| 6,169,052 B1 |   | 1/2001 | Brekner | 502/152 |
| 6,194,341 B1 | * | 2/2001 | Canich et al. | 502/113 |
| 2002/0025485 A1 |   | 2/2002 | Nakamura et al. | 430/109.3 |

FOREIGN PATENT DOCUMENTS

| | | |
|---|---|---|
| DE | 109 224 | 10/1974 |
| DE | 237 070 | 7/1986 |
| DE | 42 05 416 | 2/1992 |
| DE | 19 633 641 | 2/1998 |
| EP | 128 045 | 12/1984 |
| EP | 156 464 | 10/1985 |
| EP | 407 870 | 1/1991 |

(Continued)

*Primary Examiner*—Thao T. Tran
(74) *Attorney, Agent, or Firm*—Connolly Bove Lodge & Hutz LLP

(57) ABSTRACT

The present invention relates to a process for producing a bimodal or multimodal mixture of amorphous polyolefins having a different molar mass, in which at least one amorphous polyolefin having a high molar mass is brought into contact and mixed with at least one amorphous polyolefin having a low molar mass in solution and the solvent is subsequently removed.

20 Claims, 2 Drawing Sheets

| | FOREIGN PATENT DOCUMENTS | | |
|---|---|---|---|
| EP | 483 223 | 5/1992 | |
| EP | 485 893 | 5/1992 | |
| EP | 503 422 | 9/1992 | |
| EP | 843 223 | 5/1998 | |
| EP | 0843223 | 5/1998 | |
| EP | 849 074 | 6/1998 | |
| WO | 96/18662 | 6/1996 | |
| WO | 98/29783 | 7/1998 | |

* cited by examiner

METHOD OF PRODUCING AMORPHOUS POLYOLEFINS WITH A WIDE MOLE WEIGHT DISTRIBUTION

BACKGROUND OF THE INVENTION

1. Field of the Invention

The invention relates to a continuous process for producing mixtures of amorphous polyolefins having a broad molar mass distribution and a uniform glass transition temperature.

2. Description of Related Art

To produce a bimodal or multimodal mixture of amorphous polyolefins, two or more polyolefins having different molar masses have to be mixed and homogenized. In the case of a small difference in the molar masses of the starting components and consequently a small difference in the melt viscosities, mixing can be carried out in the melt. This occurs in the case of extrusion. However, above a certain difference in the melt viscosities, homogeneous mixing of amorphous polyolefins in the melt can no longer be carried out. According to Karam, Bellinger, Ind. A. Chem. Eng. Fund 7(1968) 4, 571–581, this limit is reached when the viscosity ratio of secondary component to main component of the mixture is less than 0.005 and greater than 4. Accordingly, narrow limits are imposed on the effective mixing of a relatively high molecular weight polymer into a low molecular weight matrix via the melt. Melt mixing can only be carried out by means of a number of melt mixers connected in series. However, such a process has high capital costs and process costs and its economics are therefore poor.

EP-A-0 843 223 discloses a bimodal toner. The mixture is produced batchwise. The relatively high molecular weight component has a molecular weight ($M_w$) of 70,000 g/mol, a viscosity number (VN) of 80 ml/g and a glass transition temperature above 70° C. The toner is produced by mixing the starting components in the melt.

In the case of large differences in the molar masses of the blend components, the melt viscosities differ so much that the production of a homogeneous blend via the melt is possible only with great difficulty.

WO 98/29783 discloses a tower having a broad molar mass distribution (bimodal, multimodal, broad distribution without separate peaks). The preparation of the base material and mixing were carried out batchwise. The relatively high molecular weight component had an $M_w$ of 100 000 g/l and VN of 130 ml/g, therefore somewhat higher than EP-A-0 843 223. In the case of large differences in the molar mass of the blend components, the melt viscosities differ so greatly the production of a homogenous blend via the melt is extremely difficult.

EP-A-0 128 045 discloses a process for preparing crystalline polyolefins. The catalyst system for the polymerization of ethylene to form polyethylene comprises two different metallocenes. The process of homogeneous catalysis and the resulting polyethylene having a polydispersity of from 2 to 50 are likewise described. In contrast, corresponding catalyst systems for preparing amorphous cycloolefin polymers are extremely difficult to find. Firstly, they have to catalyze the reaction highly specifically without forming light-scattering by-products which reduce the transparency of the material, and, secondly, these catalysts should display the same copolymerization diagram so that under identical reaction conditions a plastic having only one macroscopically observable glass transition temperature is formed.

WO 96/18662 discloses a process for preparing polyethylene in which the first stage is carried out in a low-boiling hydrocarbon in a loop reactor, the second stage is likewise carried out in a solvent in a loop reactor and the third stage is carried out in the gas phase. In each stage, further catalyst, cocatalyst, ethylene or hydrogen can be added. The high molecular weight component is prepared in the first stage. In the gas-phase reactor, a $C_4$–$C_8$-α-olefin can also be added as comonomer. This process cannot be applied to the preparation of cycloolefin copolymers since gas-phase reactors are unsuitable for liquid comonomers. Furthermore, the catalysts should catalyze the reaction highly specifically without light-scattering by-products being formed.

BRIEF SUMMARY OF THE INVENTION

It is an object of the present invention to provide an economical and environmentally friendly continuous process for producing a bimodal or multimodal mixture of one or more amorphous polyolefins.

This object is achieved by a process for producing a bimodal or multimodal mixture of amorphous polyolefins regardless of the difference in the mean molar mass and in the molar mass distribution of the amorphous polyolefins, wherein at least one amorphous polyolefin having a high molar mass is brought into contact and mixed with at least one amorphous polyolefin having a low molar mass in solution and the solvent is subsequently removed.

According to the invention, preference is given to a process in which the amorphous polyolefin having a high molar mass has a VN of >80 ml/g and an $M_w$ of >90,000 g/mol, preferably a VN of >120 ml/g and an $M_w$ of >120,000 g/mol, particularly preferably a VN of >150 ml/g and an $M_w$ of >150,000 g/mol. Such polyolefins can be processed only with extreme difficulty in the melt.

According to the invention, particular preference is given to a process in which the amorphous polyolefin having a high molar mass is a cycloolefin copolymer. Cycloolefin copolymers can readily be prepared industrially by means of metallocene catalysts or other transition metal compounds.

DETAILED DESCRIPTION OF THE INVENTION

Figure 1:
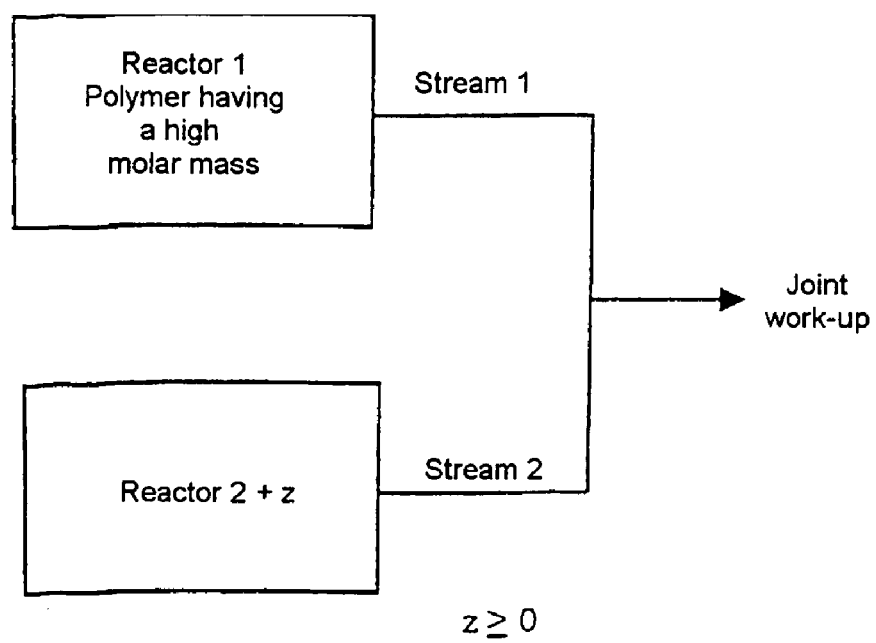
FIG. 1 illustrates variant 1 according to the invention having two or more reactors connected in parallel.

The bimodal or multimodal mixture comprises at least one cycloolefin copolymer comprising from 0.1 to 100% by weight, preferably from 0.1 to 99.9% by weight, particularly preferably from 10 to 90% by weight and very particularly preferably from 30 to 70% by weight, based on the total mass of the cycloolefin copolymer, of polymerized units derived from at least one polycyclic olefin of the formula I, II, II', III, IV, V or VI.

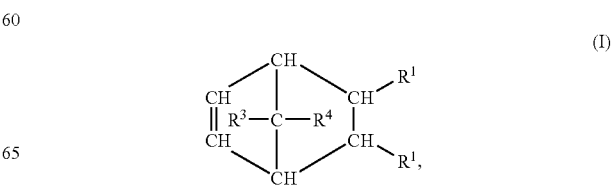

-continued

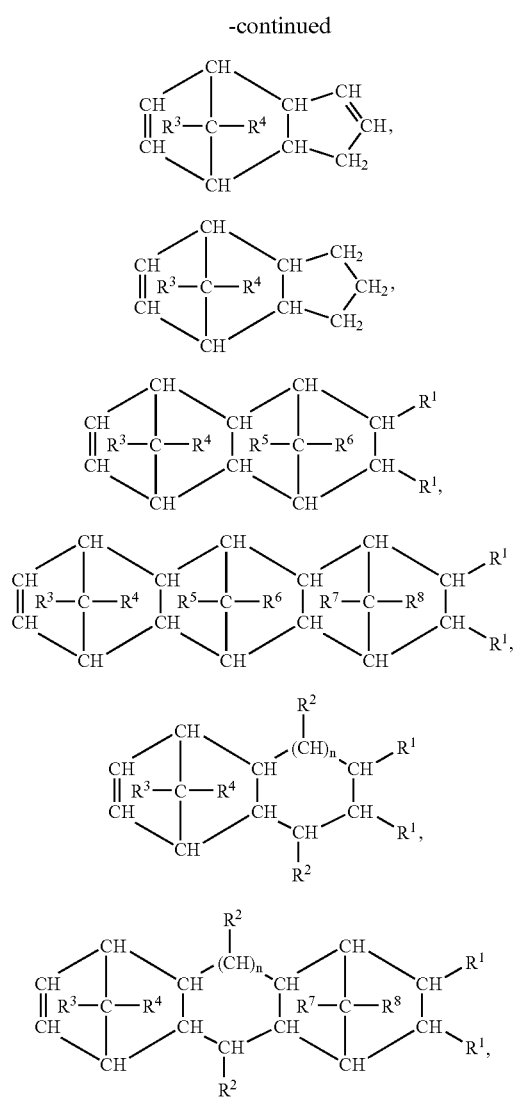

where $R^1$, $R^2$, $R^3$, $R^4$, $R^5$, $R^6$, $R^7$ and $R^8$ are identical or different and are each a hydrogen atom or a $C_1$–$C_{20}$-hydrocarbon radical such as a linear or branched $C_6$–$C_8$-alkyl radical, a $C_6$–$C_{18}$-aryl radical, a $C_7$–$C_{20}$-alkylenearyl radical or a cyclic or acyclic $C_2$–$C_{20}$-alkenyl radical or form a saturated, unsaturated or aromatic ring, where identical radicals $R^1$ to $R^8$ in the various formulae I to VI can have different meanings, and n can be from 0 to 5, and, if desired, up to 99.9% by weight, preferably from 0.1 to 99.9% by weight, particularly preferably from 10 to 90% by weight and very particularly preferably from 30 to 70% by weight, based on the total mass of the cycloolefin copolymer, of polymerized units derived from one or more acyclic olefins of the formula VII

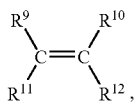  (VII)

where $R^9$, $R^{10}$, $R^{11}$ and $R^{12}$ are identical or different and are each a hydrogen atom, a linear, branched, saturated or unsaturated $C_1$–$C_{20}$-hydrocarbon radical such as a $C_1$–$C_8$-alkyl radical or a $C_6$–$C_{18}$-aryl radical.

In addition, the cycloolefin copolymers used according to the invention may further comprise from 0 to 45% by weight, based on the total mass of the cycloolefin copolymer, of polymerized units derived from one or more monocyclic olefins of the formula VIII

  (VIII)

where m is from 2 to 10.

The cyclic olefins likewise include derivatives of these cyclic olefins containing polar groups such as halogen, hydroxyl, ester, alkoxy, carboxy, cyano, amido, imido or silyl groups.

For the purposes of the invention, preference is given to cycloolefin copolymers which comprise polymerized units derived from polycyclic olefins of the formula I or III and polymerized units derived from acyclic olefins of the formula VII.

Particular preference is given to cycloolefin copolymers which comprise polymerized units derived from olefins having a norbornene skeleton, preferably norbornene, tetracyclododecene, vinylnorbornene or norbornadiene, particularly preferably norbornene or tetracyclododecene.

Particular preference is also given to cycloolefin copolymers which comprise polymerized units derived from acyclic olefins having terminal double bonds, e.g. α-olefins having from 2 to 20 carbon atoms, very particularly preferably ethylene or propylene. Greatest preference is given to norbornene-ethylene and tetracyclododecene-ethylene copolymers.

It can also be advantageous to use terpolymers, particularly preferably norbornene-vinylnorbornene-ethylene, norbornene-norbornadiene-ethylene, tetracyclododecene-vinylnorbornene-ethylene, tetracyclododecene-vinyltetracyclododecene-ethylene or norbornene-dicyclopentadiene-ethylene terpolymers.

The proportion of polymerized units which are derived from a polyene, preferably vinylnorbornene or norbornadiene, is from 0.1 to 50 mol %, preferably from 0.1 to 20 mol %, and the proportion of the acyclic monoolefin of the formula VII is from 0 to 99.9 mol %, preferably from 5 to 80 mol %, based on the overall composition of the cycloolefin polymer. In the terpolymers described, the proportion of the polycyclic monoolefin is from 0.1 to 99.9 mol %, preferably from 3 to 75 mol %, based on the overall composition of the cycloolefin polymer.

Further amorphous polymers suitable for use according to the invention are described in EP-A-317262. Hydrogenated polymers and copolymers, e.g. of styrene or dicyclopentadiene, and other amorphous polyolefins are likewise suitable.

The cycloolefin copolymers used according to the invention can be prepared at temperatures of from −78 to 200° C. at a pressure of from 0.01 to 200 bar in the presence of one or more catalyst systems comprising at least one transition metal compound and, if appropriate, a cocatalyst and, if appropriate, a support material. Suitable transition metal compounds include metallocenes, in particular stereorigid metallocenes. Examples of catalyst systems which are suitable for the preparation of the cycloolefin copolymers used according to the invention are described in U.S. Pat. No. 5,008,356, EP-A-0 407 870, EP-A-0 485 893 and EP-A-0

503 422. These references are hereby expressly incorporated by reference into the present patent application.

Examples of transition metal compounds used are:
rac-dimethylsilyl bis(1-indenyl)zirconium dichloride,
rac-dimethylgermyl bis(1-idenyl)zirconium dichloride,
rac-phenylmethlsilyl bis(1-indenyl)zirconium dichloride,
rac-phenylvinylsilyl bis(1-indenyl)zirconium dichloride,
1-silacyclobutyl bis(1-indenyl)zirconium dichloride,
rac-diphenylsilyl bis(1-indenyl)hafnium dichloride,
rac-phenylmethylsilyl bis(1-indenyl)hafnium dichloride,
rac-diphenylsilyl bis(1-indenyl)zirconium dichloride,
rac-ethylene-1,2 bis(1-indenyl)-zirconium dichloride,
dimethylsilyl(9-fluorenyl)(cyclopentadienyl)zirconium dichloride,
diphenylsilyl(9-fluorenyl)(cyclopentadienyl)zirconium dichloride,
bis(1-indenyl)zirconium dichloride,
diphenylmethylene(9-fluorenyl)cyclopentadienylzirconium dichloride,
isopropylene(9-fluorenyl)cyclopentadienylzirconium dichloride,
rac-isopropylidene bis(1-indenyl)zirconium dichloride,
phenylmethylmethylene(9-fluorenyl)cyclopentadienylzirconium dichloride,
isopropylene(9-fluorenyl) (1-(3-isopropyl)cyclopentadienyl)zirconium dichloride,
isopropylene(9-fluorenyl)(1-(3-methyl)cyclopentadienyl) zirconium dichloride,
diphenylmethylene(9-fluorenyl)(1-(3-methyl)cyclopentadienyl)zirconium dichloride,
methylphenylmethylene(9-fluorenyl)(1-(3-methyl)cyclopentadienyl)zirconium dichloride,
dimethylsilyl(9-fluorenyl)(1-(3-methyl)cyclopentadienyl) zirconium dichloride,
diphenylsilyl(9-fluorenyl)(1-(3-methyl)cyclopentadienyl) zirconium dichloride,
diphenylmethylene(9-fluorenyl)(1-(3-tert-butyl)cyclopentadienyl)zirconium dichloride,
isopropylene(9-fluorenyl)(1-(3-tert-butyl)cyclopentadienyl) zirconium dichloride,
isopropylene(cyclopentadienyl)(1-indenyl)zirconium dichloride,
diphenylcarbonyl(cyclopentadienyl)(1-indenyl)zirconium dichloride,
dimethylsilyl(cyclopentadienyl)(1-indenyl)zirconium dichloride,
isopropylene(methylcyclopentadienyl)(1-indenyl)zirconium dichloride,
4-($\eta^5$-cyclopentadienyl)-4,7,7-trimethyl($\eta^5$-4,5,6,7-tetrahydroindenylzirconium dichloride,
[4-($\eta^5$-cyclopentadienyl)-4,7,7-triphenyl($\eta^5$-4,5,6,7-tetrahydroindenyl)]zirconium dichloride,
[4-($\eta^5$-cyclopentadienyl)-4,7-dimethyl-7-phenyl($\eta^5$-4,5,6,7-tetrahydroindenyl)]zirconium dichloride,
[4-($\eta^5$-3'-tert-butylcyclopentadienyl)-4,7,7-triphenyl ($\eta^5$-4,5,6,7-tetrahydroindenyl)]zirconium dichloride,
[4-($\eta^5$-3'-tert-butylcyclopentadienyl)-4,7-dimethyl-7-phenyl-($\eta^5$-4,5,6,7-tetrahydroindenyl)]zirconium dichloride,
[4-($\eta^5$-3'-methylcyclopentadienyl)-4,7,7-trimethyl($\eta^5$-4,5,6,7-tetrahydroindenyl)]zirconium dichloride,
[4-($\eta^5$-3'-methylcyclopentadienyl)-4,7,7-triphenyl($\eta^5$-4,5,6,7-tetrahydroindenyl)]zirconium dichloride,
[4-($\eta^5$-3'-methylcyclopentadienyl)-4,7-dimethyl-7-phenyl ($\eta^5$-4,5,6,7-tetrahydroindenyl)]zirconium dichloride,
[4-($\eta^5$-3'isopropylcyclopentadienyl)-4,7,7-trimethyl ($\eta^5$-4,5,6,7-tetrahydroindenyl)]zirconium dichloride,
[4-($\eta^5$-3'isopropylcyclopentadienyl)-4,7,7-triphenyl($\eta^5$-4,5,6,7-tetrahydroindenyl)]zirconium dichloride,
[4-($\eta^5$-3'isopropylcyclopentadienyl)-4,7-dimethyl-7-phenyl ($\eta^5$-4,5,6,7-tetrahydroindenyl)]zirconium dichloride,
[4-($\eta^5$-cyclopentadienyl) ($\eta^5$-4,5-tetrahydropentalene)]zirconium dichloride,
[4-($\eta^5$-cyclopentadienyl)-4-methyl($\eta^5$-4,5-tetrahydropentalene)]zirconium dichloride,
[4-($\eta^5$-cyclopentadienyl)-4-phenyl($\eta^5$-4,5-tetrahydropentalene)]zirconium dichloride,
[4-($\eta^5$-cyclopentadienyl)-4-phenyl($\eta^5$-4,5-tetrahydropentalene)]zirconium dichloride,
[4-($\eta^5$-3'-methylcyclopentadienyl) ($\eta^5$-4,5-tetrahydropentalene)]zirconium dichloride,
[4-($\eta^5$-3'-isopropylcyclpentadienyl) ($\eta^5$-4,5-tetrahydropentalene)]zirconium dichloride,
[2,2,4-($\eta^5$-3'-benzylcyclopentadienyl) ($\eta^5$-4,5-tetrahyropentalene)]zirconium dichloride,
[2,2,4-trimethyl-4-($\eta^5$-cyclopentadienyl) ($\eta^5$-4,5-tetrahydropentalene)]zirconium dichloride,
[2,2,4-trimethyl-4-($\eta^5$-(3,4-diisopropyl)cyclopentadienyl) ($\eta^5$-4,5-tetrahydropentalene)]zirconium dichloride.

The cycloolefin copolymers can also be prepared in other ways which will be briefly outlined in the following: catalyst systems based on mixed catalysts comprising titanium salts and organoaluminum compounds are described in DD-A-109 224 and DD-A-237 070. EP-A-0 156 464 describes the preparation of cycloolefin copolymers due to catalysts based on vanadium.

The cycloolefin copolymers can also be prepared by ring-opening polymerization of at least one of the monomers of the formulae I to VI and subsequent hydrogenation of the products obtained.

The polymerization can also be carried out in a plurality of stages, in which block copolymers can also be formed (priority application no. DE-A-42 05 416, which corresponds to U.S. Pat. No. 5,646,330).

Cycloolefin copolymers are preferably amorphous, transparent materials. The heat distortion resistance of the cycloolefin copolymers can be set within a wide range. The glass transition temperature measured in accordance with DIN EN ISO 11357-1 can be employed as an indication of the heat distortion resistance as can be determined on injection-molded specimens in accordance with ISO 75 part 1 and part 2. The cycloolefin copolymers described here have glass transition temperatures of from −50 to 220° C. Preference is given to glass transition temperatures of from 0 to 180° C., and particular preference is given to glass transition temperatures of from 40 to 180° C.

The mean molar mass of the cycloolefin copolymers can be controlled in a known manner by introduction of hydrogen, variation of the catalyst concentration or variation of the temperature. The cycloolefin copolymers to be used according to the invention have mass average molar masses Mw of from 1000 to 10,000,000 g/ml. Preference is given to mass average molar masses $M_w$ of from 5000 to 5,000,000 g/mol, and particular preference is given to mass average molar masses $M_w$ of from 5000 to 1,200,000 g/mol. These molar masses determined by means of gel permeation chromatography (GPC) in chloroform at 35° C. with the aid of an RI detector are relative and based on a calibration using narrow-distribution polystyrene standards.

The cycloolefin copolymers described here have viscosity numbers measured in accordance with DIN 53 728 of from 5 to 5000 ml/g. Preference is given to viscosity numbers of from 5 to 2000 ml/g, and particular preference is given to viscosity numbers of from 5 to 1000 ml/g.

The optical properties of the polymer mixtures were determined on 1 mm thick pressed plates using a Gardner Haze-gard and in accordance with ASTM D 1003.

The process of the invention for producing a bimodal or multimodal mixture of one or more amorphous polyolefins regardless, of the difference in the mean molar mass and in the molar mass distribution of the amorphous polyolefins is preferably carried out according to one or more of the process variants 1 to 5.

Process variant 1 as shown in FIG. 1 comprises an assembly of two (z=0) or more (z>0) reactors connected in parallel, where the amorphous polyolefin having a high molar mass of VN>100 ml/g and $M_w$>100,000 g/mol is prepared by solution polymerization in one reactor and the other constituents of the mixture are produced in the other reactor or reactors. The reaction in these does not necessarily have to be carried out in solution. The combined solution is subsequently homomgenized and the solvent is separated off.

Figure 2:
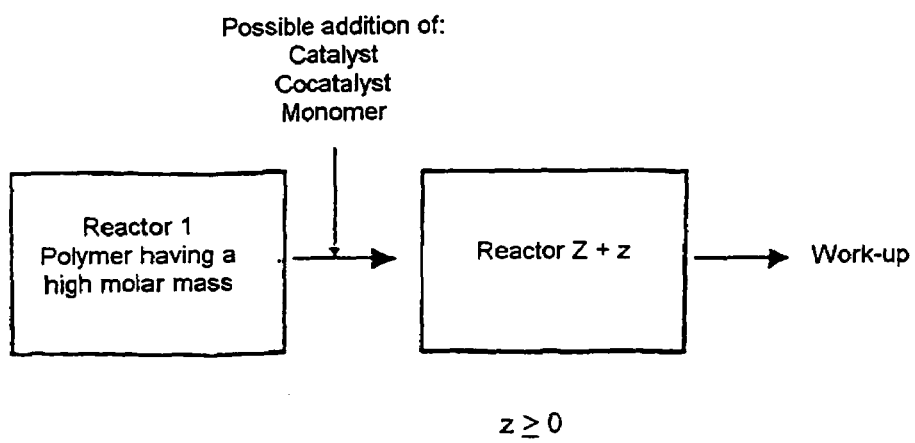
FIG. 2 illustrates variant 2 according to the invention having two or more reactors connected in series.

Process variant 2 as shown in FIG. 2 comprises an assembly of two (z=0) or more (z>0) reactors connected in series, where the amorphous polyolefin having a high molar mass of VN>100 ml/g and $M_w$>100,000 g/mol is prepared by solution polymerization in the first reactor and the other constituents of the mixture are produced in the subsequent reactors. Catalyst, cocatalyst and monomers can be metered in individually upstream of each reactor. The combined solution is subsequently homogenized and the solvent is separated off.

Figure 3:
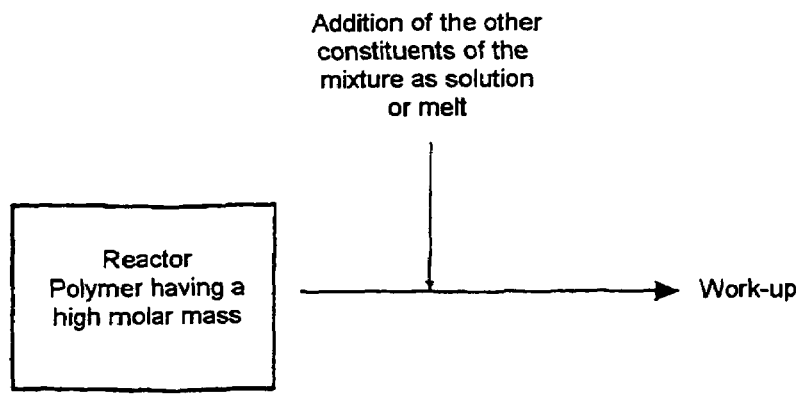
FIG. 3 illustrates variant 3 according to the invention.

Process variant 3 as shown in FIG. 3 preferably employs a reactor in which the amorphous polyolefin having a high molar mass of VN>100 ml/g and $M_w$> 100,000 g/mol is prepared by solution polymerization. The other constituents of the mixture are metered into the outflowing solution as a polymer solution having a concentration of from 1 to 100% by weight in, preferably, a hydrocarbon or hydrocarbon mixture. In the case of a solution containing 100% by weight of polymer, a polymer melt is present. The combined solution is subsequently homogenized and the solvent is separated off.

Process variant 4 preferably employs a reactor in which the amorphous polyolefin having a high molar mass of VN>100 ml/g and $M_w$>100,000 g/mol and the other constituents of the mixture are prepared simultaneously by solution polymerization using a catalyst combination. The solvent is subsequently separated off.

Process-variant 5 preferably employs a reactor in which the amorphous polyolefin having a high molar mass of VN>100 ml/g and $M_w$>100,000 g/mol and the other constituents of the mixture are prepared in succession by periodic variation over time of the regulated concentration, preferably hydrogen, propylene, α-olefins or aluminum alkyls in such a way that, regarded over the mean residence time, a constant molar mass distribution is obtained. The solvent is subsequently separated off.

Preference is given to the process variants 1 to 3.

In general, the mechanical and rheological properties of polymers are dependent on the molar mass. The higher the molecular weight, the higher the elasticity, stiffness, creep resistance, viscosity, melt viscosity, environmental stress cracking resistance, chemical resistance, etc.

However, the use of high molecular weight, amorphous polyolefins having a narrow molar mass distribution is not possible for many applications because their processing properties, mainly due to the low flowability, are unsatisfactory. The use of amorphous polyolefins having a broad molar mass distribution offers the opportunity of combining the good mechanical and rheological properties of relatively high molecular weight polyolefins with the excellent processability of low molecular weight polymers.

The bimodal or multimodal mixture of the invention can be used, in particular, for producing films having a better environmental stress cracking resistance and a reduced gel content, optical storage media (CD, DVD) having increased flowability and good chemical resistance, bottles and containers having improved environmental stress cracking resistance and chemical resistance, plastic articles having improved sterilizability by means of hot steam, gamma rays or electron beams, toner binders having improved fixing properties, e.g. broader antioffset window and higher printing speed, films and injection-molded articles having higher elasticity and stiffness, coatings having increased environmental stress cracking resistance and chemical resistance and films having improved barrier properties.

The invention is illustrated by the examples below:

EXAMPLE 1

An ethylene-norbornene copolymer having a VN of 220 ml/g, a mass average molar mass of 280,000 g/mol and a glass transition temperature of 70° C. is prepared continuously as a 6% strength by weight solution in decalin using process variant 3. A 50% strength by weight solution of another ethylene-norbornene copolymer having a VN of 15 ml/g, a mass average molar mass of 12,000 g/mol and a glass transition temperature of 65° C. in decalin is then metered continuously into the first ethylene-norbornene copolymer solution in such an amount that the proportion of the higher molecular weight polymer is 8 percent by weight of the total mass of polymer. The solution is mixed well and the solvent is removed thermally using known techniques. A pressed plate of this product has a transparency of 93.3% and a haze of 2.5%. This demonstrates the high homogeneity of the mixture.

EXAMPLE 2

An ethylene-norbornene copolymer having a VN of 220 ml/g, a mass average molar mass of 280,000 g/mol and a glass transition temperature of 70° C. is prepared continuously as a 6% strength by weight solution in decalin using process variant 3. A melt of another ethylene-norbornene copolymer having a VN of 15 ml/g, a mass average molar mass of 12,000 g/mol and a glass transition temperature of 65° C. in Exxol is then metered continuously into the first ethylene-norbornene copolymer solution in such an amount that the proportion of the higher molecular weight polymer is 15 percent by weight of the total mass of polymer. The solution is mixed well and the solvent is removed thermally using known techniques. A pressed plate of this product has a high transparency and low light scattering, indications of good homogeneity. A pressed plate of this product has a transparency of 93.0% and a haze of 2.8%. This demonstrates the high homogeneity of the mixture.

EXAMPLE 3

An ethylene-norbornene copolymer having a VN of 130 ml/g, a mass average molar mass of 120,000 g/mol and a glass transition temperature of 85° C. is prepared continuously as a 20% strength by weight solution in decalin using process variant 3. A 50% strength by weight solution of another ethylene-norbornene copolymer having a VN of 15 ml/g, a mass average molar mass of 12,000 g/mol and a glass transition temperature of 65° C. in decalin is then metered continuously into the first ethylene-norbornene copolymer solution in such an amount that the proportion of the higher molecular weight polymer is 25 percent by weight of the total mass of polymer. The solution is mixed well and the solvent is removed thermally using known techniques. A pressed plate of this product has a transparency of 93.5% and a haze of 2.4%. This demonstrates the high homogeneity of the mixture.

EXAMPLE 4

An ethylene-norbornene copolymer having a VN of 130 ml/g, a mass average molar mass of 120,000 g/mol and a glass transition temperature of 135° C. is prepared continuously as a 10% strength by weight solution in decalin using process variant 3. A 20% strength by weight solution of another ethylene-norbornene copolymer having a VN of 55 ml/g, a mass average molar mass of 60,000 g/mol and a glass transition temperature of 135° C. in decalin is then metered continuously into the first ethylene-norbornene copolymer solution in such an amount that the proportion of the higher molecular weight polymer is 10 percent by weight of the total mass of polymer. The solution is mixed well and the solvent is removed thermally using known techniques. A pressed plate of this product has a transparency of 94.0% and a haze of 1.9%. This demonstrates the high homogeneity of the mixture.

EXAMPLE 5

An ethylene-norbornene copolymer having a VN of 220 ml/g, a mass average molar mass of 280,000 g/mol and a glass transition temperature of 80° C. is prepared continuously as a 6% strength by weight solution in decalin using process variant 3. A 50% strength by weight solution of another amorphous polyolefin having a glass transition temperature of 65° C. (trade name: Escorez 5320) in decalin is then metered continuously into the first ethylene-norbornene copolymer solution in such an amount that the proportion of the higher molecular weight polymer is 10 percent by weight of the total mass of polymer. The solution is mixed well and the solvent is removed thermally using known techniques. A pressed plate of this product has a transparency of 92.9% and a haze of 3.0%. This demonstrates the high homogeneity of the mixture.

EXAMPLE 6

An ethylene-norbornene copolymer having a VN of 80 ml/g, a mass average molar mass of 100,000 g/mol and a glass transition temperature of 80° C. is prepared continuously as a 6% strength by weight solution in decalin using process variant 3. A 50% strength by weight solution of another amorphous polyolefin having a glass transition temperature of 65° C. (trade name: Escorez 5320) in decalin is then metered continuously into the first ethylene-norbornene copolymer solution in such an amount that the proportion of the higher molecular weight polymer is 25 percent by weight of the total mass of polymer. The solution is mixed well and the solvent is removed thermally using known techniques. A pressed plate of this product has a transparency of 93.2% and a haze of 2.8%. This demonstrates the high homogeneity of the mixture.

COMPARATIVE EXAMPLE 1

In a Haake TW 100 twin-screw extruder, an ethylene-norbornene copolymer having a VN of 80 ml/g, a mass average molar mass of 100,000 g/mol and a glass transition temperature of 75° C. is mixed in the melt with another ethylene-norbornene copolymer having a VN of 15 ml/g, a mass average molar mass of 12,000 g/mol and a glass transition temperature of 65° C. in such an amount that the final mixture contains 10% of the higher molecular weight amorphous polyolefin. The extruded strand of melt can clearly be seen to contain non-melted droplets which scatter light more strongly. The transparency is 89.9% and the haze is 8.8%. This is an indication of the poor homogeneity of the mixture.

COMPARATIVE EXAMPLE 2

In a Haake TW 100 twin-screw extruder, an ethylene-norbornene copolymer having a VN of 80 ml/g, a mass average molar mass of 100,000 g/mol and a glass transition temperature of 75° C. is mixed in the melt with another ethylene-norbornene copolymer having a VN of 15 ml/g, a mass average molar mass of 12,000 g/mol and a glass transition temperature of 65° C. in such an amount that the final mixture contains 20% of the higher molecular weight amorphous polyolefin. The transparency is 91.4% and the haze is 3.8%. This is an indication of the poor homogeneity of the mixture.

COMPARATIVE EXAMPLE 3

In a Haake TW 100 twin-screw extruder, an ethylene-norbornene copolymer having a VN of 80 ml/g, a mass average molar mass of 100,000 g/mol and a glass transition temperature of 75° C. is mixed in the melt with another ethylene-norbornene copolymer having a VN of 15 ml/g, a mass average molar mass of 12,000 g/mol and a glass transition temperature of 65° C. in such an amount that the final mixture contains 50% of the higher molecular weight amorphous polyolefin. The transparency is 92.8% and the haze is 3.0%. This is an indication of satisfactory homogeneity of the mixture.

COMPARATIVE EXAMPLE 4

An attempt is made to mix 85% by weight of an ethylene-norbornene copolymer having a VN of 20 ml/g and a glass transition temperature of 63° C. with 5% by weight of an ethylene-norbornene copolymer having a VN of 81 ml/g and a glass transition temperature of 75° C. and 10% by weight of an ethylene-norbornene copolymer having a VN of 115 ml/g and a glass transition temperature of 75° C. by means of a Haake TW 100 twin-screw extruder. The extruded strand can clearly be seen to contain unmelted droplets which scatter light more strongly. The transparency is 87.3% and the haze is 9.8%. This is an indication of the satisfactory homogeneity of the mixture.

COMPARATIVE EXAMPLE 5

An attempt is made to mix 80% by weight of an ethylene-norbornene copolymer having a VN of 20 ml/g and a glass transition temperature of 63° C. with 5% by weight of an ethylene-norbornene copolymer having a VN of 81 ml/g and a glass transition temperature of 75° C. and 15% by weight of an ethylene-norbornene copolymer having a VN of 115 ml/g and a glass transition temperature of 75° C. by means of a Haake TW 100 twin-screw extruder. The extruded strand can clearly be seen to contain unmelted droplets which scatter light more strongly. The transparency is 88.7% and the haze is 5.8%. This is an indication of the poor homogeneity of the mixture.

COMPARATIVE EXAMPLE 6

An attempt is made to mix 70% by weight of an ethylene-norbornene copolymer having a VN of 20 ml/g and a glass transition temperature of 63° C. with 15% by weight of an ethylene-norbornene copolymer having a VN of 81 ml/g and a glass transition temperature of 75° C. and 15% by weight of an ethylene-norbornene copolymer having a VN of 115 ml/g and a glass transition temperature of 75° C. by means of a. Haake TW 100 twin-screw extruder. The extruded strand can clearly be seen to contain unmelted droplets which scatter light more strongly. The transparency is 90.7% and the haze is 5.3%. This is an indication of the poor homogeneity of the mixture.

COMPARATIVE EXAMPLE 7

An attempt is made to extrude an ethylene-norbornene copolymer having a VN of 200 ml/g and a glass transition temperature of 65° C. through a 1×1 mm nozzle at a temperature of 310° C. and a shear stress of 2.7E5 Pa. The extruded extrudate of melt displays strong brown discoloration and has severe structuring of the surface. A viscosity of 100,000 Pas and an MFI of 0.27 cm$^3$/10 min are determined. At 280° C., no strand at all is obtained. Such a product can accordingly be processed in the melt only with extreme difficulty.

The difference in the materials properties, in particular the optical properties, between products prepared in the examples and in the comparative examples are shown in Table 1 below.

TABLE 1

| Example (E) Comparative Example (C) | Transparency (%) | Haze (%) |
| --- | --- | --- |
| E1 | 93.3 | 2.5 |
| E2 | 93.0 | 2.8 |
| E3 | 93.5 | 2.4 |
| E4 | 94.0 | 1.9 |
| E5 | 92.9 | 3.0 |
| E6 | 93.2 | 2.8 |
| C1 | 89.9 | 8.8 |
| C2 | 91.4 | 3.8 |
| C3 | 92.8 | 3.0 |
| C4 | 87.3 | 9.8 |
| C5 | 88.7 | 5.8 |
| C6 | 90.7 | 5.3 |

The invention claimed is:

1. A process for the continuous preparation of a bimodal or multimodal mixture of two or more amorphous polyolefins having a different molar mass, wherein the viscosity ratio of at least two amorphous polyolefins having a different molar mass is less than 0.005 or greater than 4 which comprises
   preparing the bimodal or multimoldal mixture by process a) or process b),
   a) preparing the amorphous polyolefin having a high molar mass by solution polymerization in one reactor of an assembly of two or more reactors connected in parallel or in series and the other constituents of the mixture, which include at least one polyolefin which has a lower molar mass than said at least one polyolefin with said high molar mass, are produced in the other reactors after which the polyolefins are mixed in solution,
   homogenizing the solution of polymer mixture obtained and separating off the solvent or
   b) preparing the amorphous polyolefin having a high molar mass by solution polymerization in one reactor and the other constituents of the mixture, which include at least one polyolefin which has a lower molar mass than said at least one polyolefin with said high molar mass, are introduced in the form of a polymer solution into the solution flowing from the reactor,
   and homogenizing the solution of polymer mixture obtained and separating off the solvent.

2. The process as claimed in claim 1, wherein the amorphous polyolefin having a high molar mass has a VN of >80 ml/g and an $M_w$ of >90,000 g/mol.

3. The process as claimed in claim 1, wherein the amorphous polyolefin having a high molar mass has a VN of >100 ml/g and an $M_w$ of >100,000 g/mol.

4. The process as claimed in claim 1, wherein the amorphous polyolefin having a high molar mass has a VN of >120 ml/g and an $M_w$ of >120,000 g/mol.

5. The process as claimed in claim 1, wherein the amorphous polyolefin having a high molar mass has a VN of >150 ml/g and an $M_w$ of >150,000 g/mol.

6. The process as claimed in claim 1, wherein the amorphous polyolefin is a cycloolefin copolymer.

7. The process as claimed in claim 1, wherein the bimodal or multimodal mixture comprises at least one cycloolefin copolymer comprising from 0.1 to 100% by weight, based on the total mass of the cycloolefin copolymer, of polymerized units derived from at least one polycyclic olefin of the formula I, II, II', III, IV, V or VI

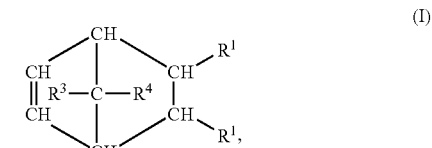

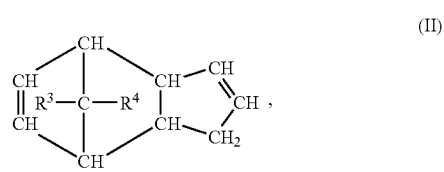

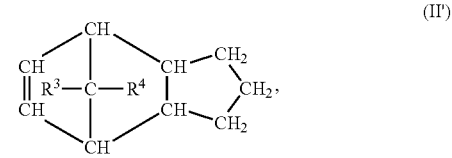

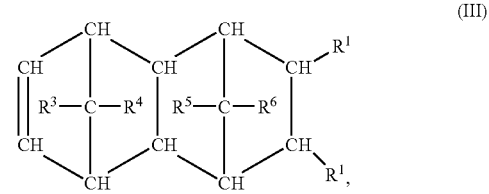

-continued

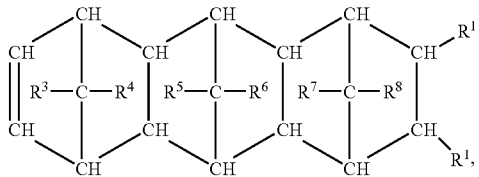
(IV)

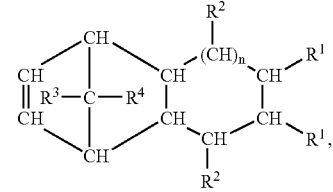
(V)

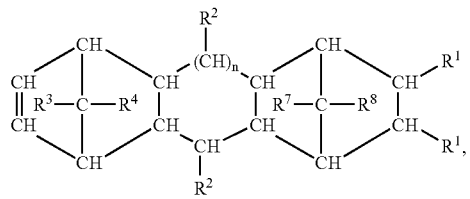
(VI)

wherein $R^1$, $R^2$, $R^3$, $R^4$, $R^5$, $R^6$, $R^7$ and $R^8$ are identical or different and are each a hydrogen atom or a $C_1$–$C_{20}$-hydrocarbon radical, or form a saturated, unsaturated or aromatic ring,
wherein identical radicals $R^1$ to $R^8$ in the various formulae 1 to VI can have different meanings, and n is from 0 to 5, and, optionally, up to 99.9% by weight, based on the total mass of the cycloolefin polymer, of polymerized units derived from one or more acyclic olefins of the formula VII

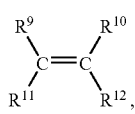
(VII)

wherein $R^9$, $R^{10}$, $R^{11}$ and $R^{12}$ are identical or different and are each a hydrogen atom, a linear, branched, saturated or unsaturated $C_1$–$C_{20}$-hydrocarbon radical.

8. The process as claimed in claim 7, wherein the cycloolefin copolymers further comprise up to 45% by weight, based on the total mass of the cycloolefin copolymer, or polymerized units derived from one or more monocyclic olefins of the formula VIII

(VIII)

wherein m is from 2 to 10.

9. The process as claimed in claim 8, wherein the cyclic and polycyclic olefins contain one or more substituents selected from the group consisting of halogen, hydroxyl, ester, alkoxy, carboxy, cyano, amido, imido and silyl.

10. The process as claimed in claim 8, wherein the cycloolefin copolymers comprise polymerized units derived from polycyclic olefins of the formula I or III and polymerized units derived from acyclic olefins of the formula VII.

11. The process as claimed in claim 8, wherein the cycloolefin copolymers comprises polymerized units derived from olefins having a norbornene skeleton.

12. The process as claimed in claim 8, wherein the cycloolefin copolymers comprise polymerized units derived from acyclic α-olefins having from 2 to 20 carbon atoms.

13. The process according to claim 8, wherein $R^9$, $R^{10}$, $R^{11}$ and $R^{12}$ are identical or different and are each a hydrogen atom, a $C_1$–$C_8$ alkyl radical or a $C_6$–$C_{18}$ aryl radical.

14. The process as claimed in claim 11, wherein the cycloolefin copolymer comprise norbornene, tetracyclododecene, vinylnorbornene or norbornadiene.

15. The process as claimed in claim 12, wherein the α-olefin is ethylene.

16. The process according to claim 12, wherein the α-olefin is propylene.

17. The process according to claim 8, wherein $R^1$, $R^2$, $R^3$, $R^4$, $R^5$, $R^6$, $R^7$ and $R^8$ are identical or different and are each a hydrogen atom, a $C_1$–$C_8$ alkyl radical, $C_6$–$C_{18}$ aryl radical, a $C_7$–$C_{20}$ alkylenearyl radical, a cyclic or acyclic $C_2$–$C_{20}$ alkenyl radical or form a saturated, unsaturated or aromatic ring.

18. A process for the continuous preparation of a bimodal or multimodal mixture of two or more amorphous polyolefins having a different molar mass wherein at least one polyolefin has a high molar mass and at least one polyolefin has a lower molar mass than said at least one polyolefin with said high molar mass which comprises solution polymerizing the amorphous polyolefin having a high molar mass in one reactor of an assembly of two or more reactors connected in parallel or in series and producing the amorphous polyolefin with the lower molecular mass in the other reactors mixing the amorphous polyolefin having a high molar mass with the amorphous polyolefin having a lower molar mass in solution,
homogenizing the solution of polymer mixture obtained and
separating off the solvent.

19. The process as claimed in claim 18, wherein said assembly is of two or more reactors connected in parallel.

20. A process for the continuous preparation of a bimodal or multimodal mixture of two or more amorphous polyolefins having a different molar mass wherein at least one polyolefin has a high molar mass and at least one polyolefin has a lower molar mass than said at least one polyolefin with said high molar mass, which comprises
solution polymerizing the amorphous polyolefin having a high molar mass in one reactor and introducing the amorphous polyolefin with the lower molecular mass in the form of a polymer solution into the solution flowing from the reactor,
homogenizing the solution of polymer mixture obtained and
separating off the solvent.

* * * * *